United States Patent [19]
Amyot

[11] Patent Number: 5,369,360
[45] Date of Patent: Nov. 29, 1994

[54] RECESSED PADDLE WHEEL SPEED MEASURING DEVICE FOR PERSONAL WATERCRAFT

[75] Inventor: Andre Amyot, Deauville, Canada

[73] Assignee: Bombardier Inc., Montreal, Canada

[21] Appl. No.: 985,899

[22] Filed: Dec. 4, 1992

[51] Int. Cl.[5] .................... G01G 21/10; G01P 3/48
[52] U.S. Cl. .................... 324/174; 324/167; 73/187
[58] Field of Search ............ 73/186, 187, 861.187, 73/861.188, 861.74, 185, 189; 324/167, 173, 174; 416/223 R, 197 A; 415/216

[56] References Cited

U.S. PATENT DOCUMENTS

| | | | |
|---|---|---|---|
| Re. 28,839 | 6/1976 | Overs | 73/187 |
| 918,097 | 4/1909 | Speed et al. | 73/187 |
| 3,137,164 | 6/1964 | Spencer, Jr. | |
| 3,175,396 | 3/1965 | Kock | |
| 3,287,969 | 11/1966 | Hardy | |
| 3,433,065 | 3/1969 | Mergler | 73/187 |
| 3,457,782 | 7/1969 | Maeder et al. | |
| 3,496,770 | 2/1970 | Fassett II | 73/187 |
| 3,531,988 | 10/1970 | Casani et al. | 73/187 |
| 3,706,224 | 11/1972 | Overs | 73/187 |
| 4,206,637 | 6/1980 | Pankonien | 73/187 |
| 4,399,695 | 8/1983 | Peyton | 73/185 |
| 4,507,960 | 4/1985 | Hufnagel et al. | 73/187 |
| 4,555,938 | 12/1985 | Boucher et al. | 73/187 |
| 4,644,787 | 2/1987 | Boucher et al. | 73/187 |
| 4,644,788 | 2/1987 | Boucher | 73/187 |
| 4,653,320 | 5/1987 | Laforge et al. | 73/185 |
| 4,836,020 | 6/1989 | Boucher | 73/187 |
| 4,898,029 | 2/1990 | Boucher | 73/187 |

*Primary Examiner*—Walter E. Snow
*Assistant Examiner*—J. M. Patidar
*Attorney, Agent, or Firm*—Galgano & Burke

[57] ABSTRACT

A speed measuring device for use with shallow draft jet pump propelled boats includes a magnetized paddle wheel with diametrically opposed paddles having similar charges and adjacent paddles having opposite charges which is mounted in a housing adjacent a "hall-effect" device which translates the rate of rotation of the paddle wheel into a speed measurement reading due to the changes in the frequency of changes in the electrical field produced by rotation. The present invention is different from all other speed measuring devices in that the paddles do not protrude beyond the outer surface of the hull of the watercraft and therefore cannot become damaged by sand, rocks, or other floating debris. The invention includes a substantially flat base plate with a progressive recess on the underside thereof. This progressive recess carries water to a cavity or housing within which the paddle wheel is rotatably mounted.

16 Claims, 3 Drawing Sheets

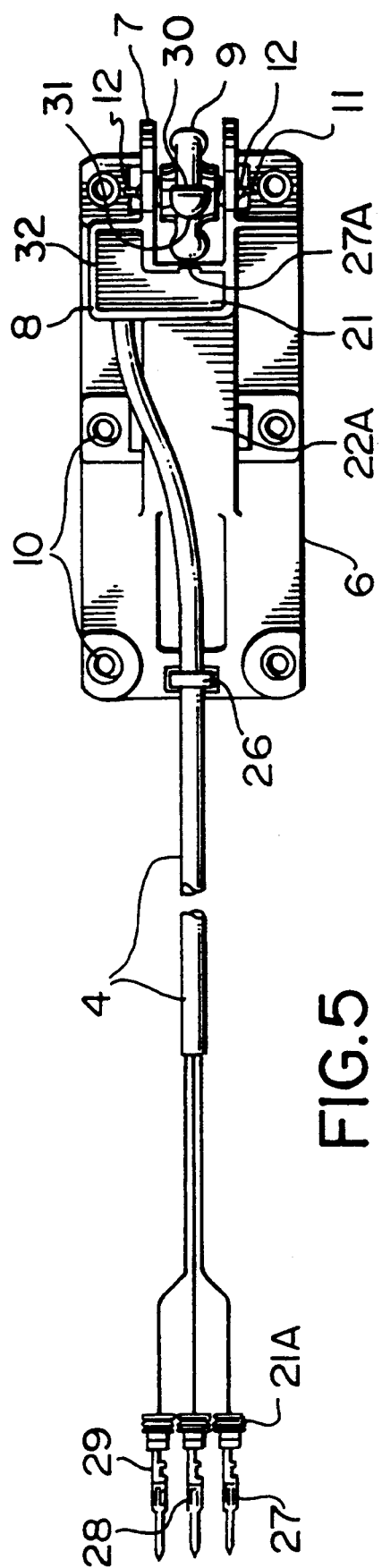
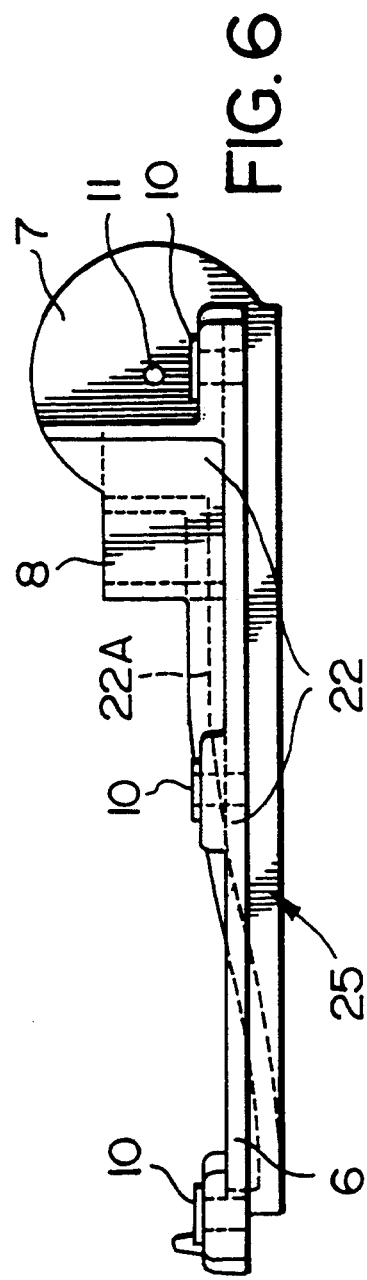
FIG. 5
FIG. 6

RECESSED PADDLE WHEEL SPEED MEASURING DEVICE FOR PERSONAL WATERCRAFT

FIELD OF INVENTION

This invention relates to speed measuring devices for watercraft, and more particularly to speed measuring devices which use a paddle wheel having a plurality of magnetically charged paddles which upon rotation produce changes in the electrical signal.

BACKGROUND

In recent years the use of magnetized paddle wheels for measuring the speed of a vessel have been used extensively. Paddle wheels being rotatably mounted on the side or bottom of the hull such that the tips of the paddles having opposite charges rotate very closely past a "hall-effect" device, are used extensively.

Such a device is shown in U.S. Pat. No. 4,644,788 wherein the paddle wheel is incorporated into a separate paddle wheel assembly. Struts hold the paddle wheel in a rotatably mounted position. The blades of the paddle wheel extend downwardly, out of the housing, in order to be in contact with the water flowing along the bottom of the hull of a boat when the boat is in motion. In U.S. Pat. No. 4,644,788 the housing on which the paddle wheel is mounted is removable from the other components for the purpose of cleaning off debris or weeds which collect on the paddle wheel and restrict its rotational speed.

In U.S. Pat. Nos. 4,898,029, and 4,836,020, entitled Marine Instrument, a sensing device which consists of a paddle wheel having a plurality of magnetized paddles extending from a central hub is disclosed. The paddle wheel is mounted within a cavity formed within the lower portion of a housing. The housing passes through the hull of the boat a certain distance in order to avoid a "boundary effect". The ends of the paddles, during rotation, extend below the housing in order to be moved by the flow of water.

All of the prior art known devices suffer from one particular disadvantage in that the arrangement of the paddle wheel is such that the paddles extend outwardly, beyond the surface of the hull, whether it be the side, bottom or other portion thereof. Consequently, such devices are open to damage from rocks or obstacles. In weedy lakes the paddles collect debris.

The protection of the speed measuring device and the possibility of damage is not severe in larger marine vessels which always remain in deep water. However, the problem is quite severe for smaller watercraft which are sometimes pulled or driven up on the shore.

The damage problem is particularly severe when known speed measuring devices are used with the new personal watercraft such as those sold under the trademarks SEA-DOO* and JET-SKI*. This type of watercraft is often driven up onto sandbars as they are propellerless, being powered by jet pumps. Thus, the known prior art speed measuring devices are not suitable for this line of watercraft because the paddles of the paddle wheel extend beyond the bottom of the hull of the craft in an unprotected position.

It is therefore an object of the present invention to provide a speed measuring device for use with personal jet pump propelled watercraft wherein the moving parts of the device do not protrude beyond the boundaries of the hull.

It is a further object of the present invention to provide a speed measuring device wherein a rotatable paddle wheel is protected within a cavity formed by a housing and is easily adaptable to installation on a personal watercraft.

SUMMARY OF THE INVENTION

Therefore this invention seeks to provide a watercraft speed measuring device comprising: a protective housing having a pair of opposed side walls that at least in part define a narrow channel having an open side; a paddle wheel rotatably mounted in said housing, said paddle wheel having a series of paddles that move through said channel upon rotation of said paddle wheel, said paddles being at a location that is recessed from the open side of said channel; said channel being of a width greater than that of said paddle wheel; said protective housing being configured for attachment to a watercraft hull with said channel being oriented in the fore-and-aft direction of the hull and with said open side below the water line and open to the water, such that said paddles are exposed to the water through which said watercraft travels to be rotated thereby, while being shielded from damage by their recessed location; and sensing and readout means associated with said paddle wheel to indicate the water speed of said watercraft as a function of the speed of rotation of said paddle wheel.

This invention also seeks to provide a watercraft speed measuring device wherein said protective housing is integral with said base plate, and adjacent and rearward of a sealed housing containing said sensing means.

The device of the present invention is comprised of a base plate, protective housing, paddle wheel, and "hall-effect" device, coupled to a cable which runs to a speedometer indicator. The device is affixed to the lower central rear portion of a personal watercraft below the jet pump outlet. In particular, the device is fixed on top of a ride shoe which is generally planar in configuration and mounted below a central recess in the mid rear portion of the hull such that the ride shoe lies substantially in the same plane as the adjacent portions of the bottom of the hull.

The paddle wheel, upon rotation, produces changes in electro-magnetic signal proportional to the marine vessel's speed. The "hall-effect" device which is installed in an L-shaped compartment adjacent the paddle wheel converts the changes in magnetic field from the paddle wheel to an electrical signal. A wire from the "hall-effect" device or speed sensor, as it is often called, is directed through the rear of the transom to a speedometer mounted for driver's visibility.

The paddle wheel is rotatably mounted on a axle within a cavity created between two planar circular side walls and a front wall; the front wall being at a right angle to the side walls, and parallel to the axis of rotation of the paddle wheel, which in turn, is transverse to the direction of the watercraft; the axis of rotation of the paddle wheel being transverse to the direction of the watercraft.

The paddle wheel is an integral structure from which four asymmetrically shaped paddles extend about the periphery at 90° from each other. The paddle wheel is formed of an amorphous magnetized material such as barium ferrite. The paddles are generally polarized with respect to each other.

In a preferred embodiment two paddles which are diametrically opposed to each other, are magnetized with the north pole charge and the two remaining paddles, also at 180° from one another, are magnetized with a south pole charge. As the paddle rotates about the shaft when the vessel traverses the water, the variation in the magnetic field is sensed by the "hall-effect" device.

The paddle wheel housing is comprised of two side walls, formed from a non-ferrous material such as plastic, and is integral with a substantially forwardly directed base plate which is attached to the top of a ride shoe in register with an open-ended elongate slot located in the rear central portion of the ride shoe. The underside of the base plate is planar with the exception of the base plate keys which extend downwardly in a configuration which matingly engages the slot on the ride shoe.

On the underside of the base plate is a progressive recess between two walls which, during movement of the watercraft, permits water to flow upwardly into the recess and into the paddle wheel cavity, moving the blades of the paddle wheel accordingly. A profile of the paddle shows a bluff frontal surface and a convex aft surface to produce a high drag coefficient rate. The radius of the paddle wheel in a preferred embodiment is about 0.6 inches.

The inventiveness of the design of the housing is that the bottom of the housing or base plate is flush with the bottom of the hull. Thus there is no chance of damage to the paddle wheel from floating debris or the lake bottom. The tips of the paddles extend below the upper surface of the recess, but not as far downwardly as the bottom of the ride shoe. The housing in which the paddle wheel rotates is open at the top, rear and bottom such that the flow of water through the recess engages each paddle extending downwardly in the paddle wheel housing.

BRIEF DESCRIPTION OF THE DRAWINGS

The invention will be more clearly described in detail in accordance with the following drawings wherein:

FIG. 5 is a top schematic view of the invention prior to mounting on the watercraft; and FIG. 6 is a side view of the housing of the invention.

DETAILED DESCRIPTION OF THE DRAWINGS

Figure 1:
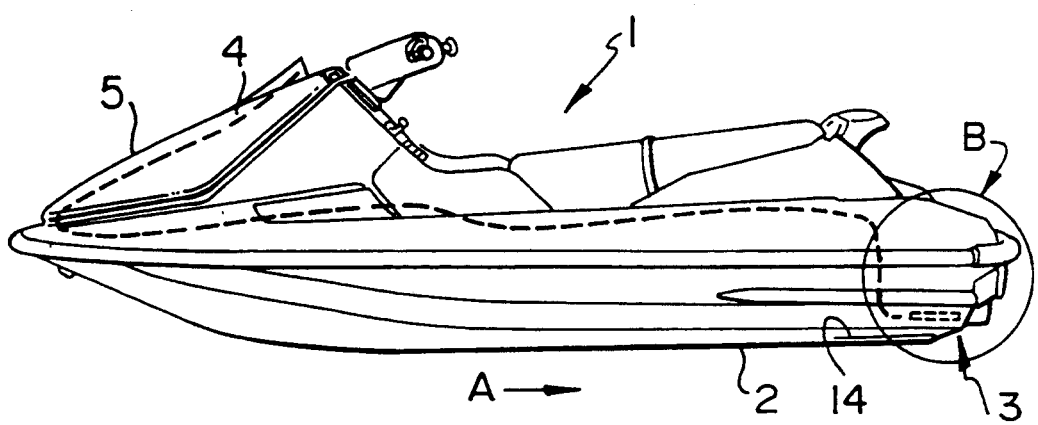
FIG. 1 is a side view of a personal watercraft.

In FIG. 1, a watercraft 1 having a hull 2 is shown. The present invention is located in the area indicated with dotted lines and labelled as 3 within circle B. Below the device 3 is a ride plate 13 (shown in FIG. 2) with a pair of keels shown generally as 14 which are located on the underside of said ride plate. A lead wire 4 is shown in dotted lines. It leads from the invention 3 to a storage cover 5.

Figure 2:
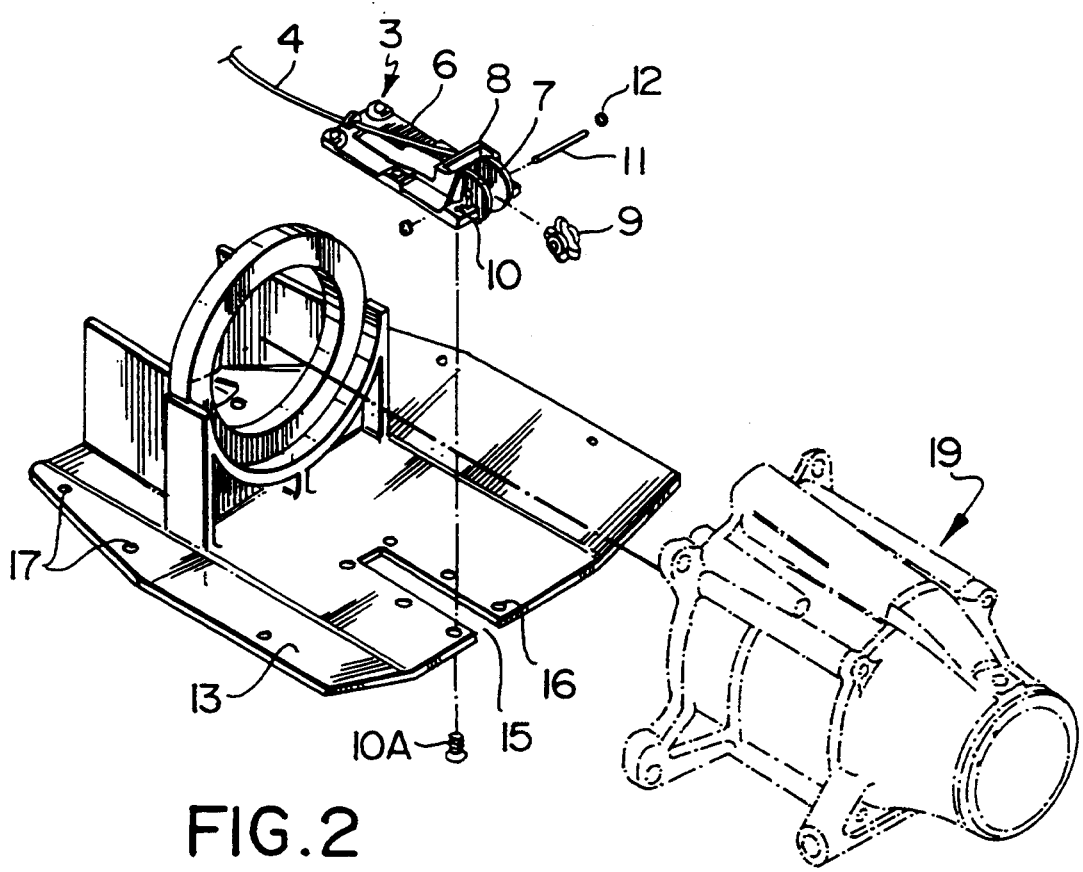
FIG. 2 is a partial assembly view of a portion of the lower rear central end of the watercraft shown in FIG. 1 as B.

FIG. 2 is the partial assembly view portion of the central rear area B of FIG. 1. The invention shown generally as 3 with its cable 4 includes a moulded planar base plate 6. Integral with the base plate 6 are raised circular side walls 7 which comprise the paddle wheel housing. The paddle wheel 9 is adapted to rotate on a shaft 11 mounted between the paddle wheel housing walls 7. Circlips 12 are fitted on either end of the shaft. Immediately in front of the paddle wheel housing is a "hall-effect" device housing shown as 8.

The base plate 6 is equipped with a plurality of threaded apertures 10 which are used to affix the base plate 6 by means of screws 10A onto a ride shoe 13. The ride shoe 13, once bolted to the hull by means of ride shoe attachment apertures 17, lies approximately in the same plane as the hull bottom. It is affixed to the hull in an area which is both rear and central and which houses the jet pump 19. The jet pump 19 is attached by means of studs 20A and nuts 20 through the wall of the recessed portion of the hull. The ride shoe 13 has an elongate open-ended aperture 15 in its central rear portion. The aperture is adapted to receive the base plate keys 25 of the present invention.

Figure 3:
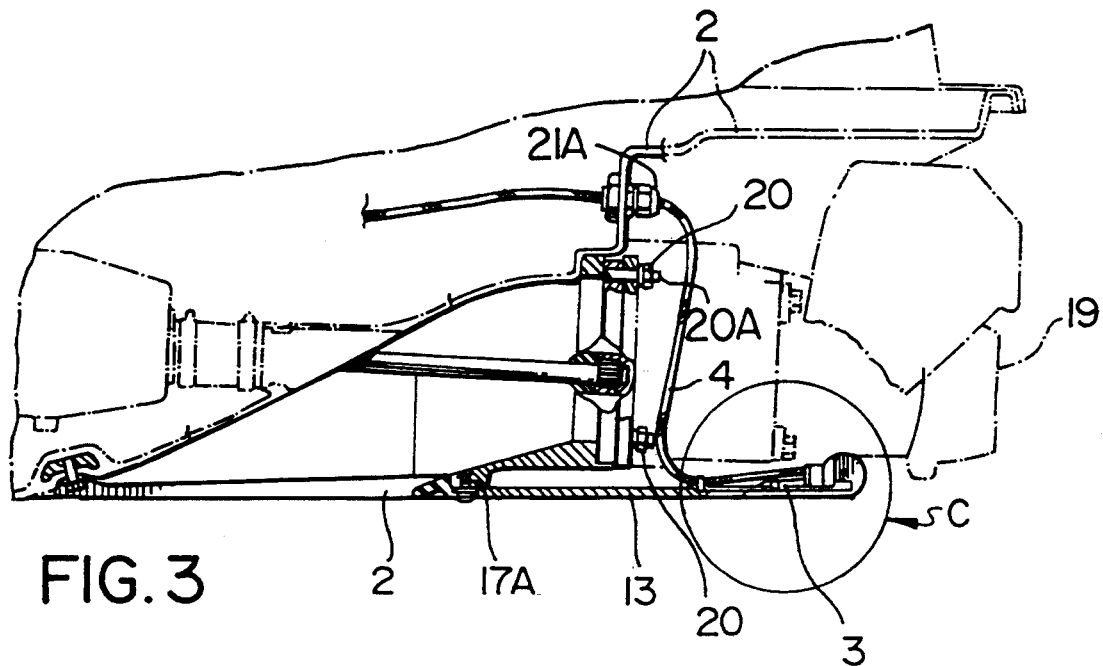
FIG. 3 is an enlarged cutaway portion of area B in FIG. 1.

FIG. 3 is a cutaway portion of area B of FIG. 1. One notes the positioning of the invention 3 on top of the ride shoe 13. The ride shoe lies essentially in the same plane as the bottom of the hull. The ride shoe 13 is mounted to the hull 2 in the recessed middle rear portion thereof by means of ride plate mounting bolts 17A. The jet pump 19 is also affixed to the rear of the hull 2 above the ride shoe 13 in register with an aperture by means of studs 20A and nuts 20. Jet pump 19 protrudes rearwardly from the hull recess and terminates adjacent to the upper rear edge of the hull 2. The cable 4 which is attached to the speed measuring device 3, passes through an aperture in the hull which is sealed by a connector 21A.

Figure 4:
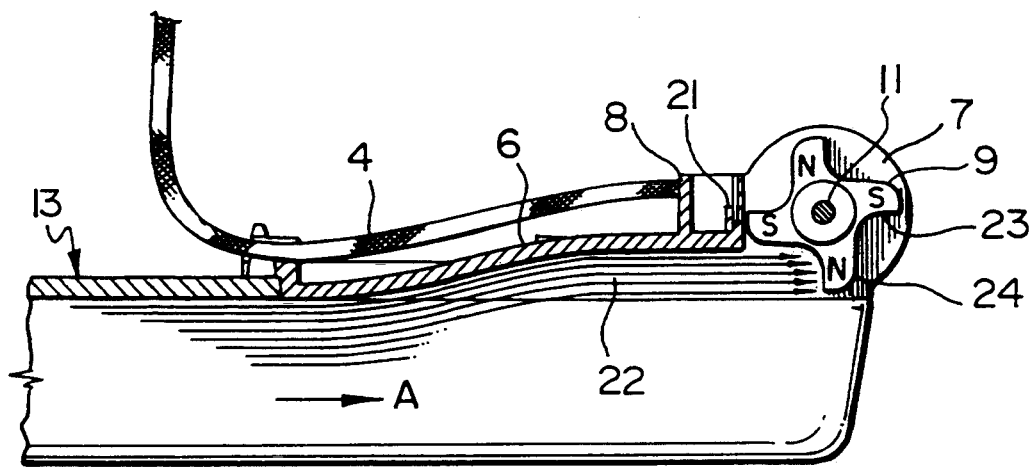
FIG. 4 is an enlarged view of a portion shown as C in FIG. 3.

FIG. 4 is an enlarged view of the portion shown as C in FIG. 3. As the boat moves forwardly a current of water moves in the direction of the arrow shown as A, and upwards through the progressive recess 22 of the base plate housing 7, and thereafter moves the paddles 23, 24 of the paddle wheel 9. One notes how adjacent paddles have opposite charges. These are shown on paddle 23 as S and paddle 24 as N, meaning south pole and north pole. The rotation of these paddles 23, 24 causes changes in a magnetic field which affects the speed sensor "hall-effect" device 21. The ends of paddles 23, 24 do not protrude below the outer bottom surface of the hull.

The housing 7 is adapted to fit within aperture 15 of ride shoe 13 by means of base plate keys 25, as seen in the side view of FIG. 6.

FIG. 5 is a top schematic view of the present invention. Cable 4 leads rearwardly and passes through the wall of the hull 2 through a sealed connector 21A. Cable 4 has within itself three wires 27, 28 and 29. Wire 27 is the sensor signal wire which transmits the changes in magnetic field, while wires 28 and 29 supply power to the "hall-effect" device from the 12 volt circuit. The cable 4 is secured to the base plate 6 by means of a bracket 26. The "hall-effect" device housing 8 is sealed completely to keep moisture out by means of seal 32.

Paddle wheel 9 is shown in greater detail in FIG. 5. The portion of each paddle which is activated by the water flowing through recess 22 is slightly concave or flat portion 30 with a high drag coefficient while the opposite side is a convex rounded portion 31 with a low drag coefficient. Sensor wall 27A is the closest portion of the "hall-effect" device housing 8 to the ends of the rotating paddles and is much thinner than the remainder of the walls of the "hall-effect" device housing 8. In FIGS. 5 and 6, the top wall 22A of recess 22 is shown as a slight bulge upward in the center of the base plate 6.

In FIG. 6, in dotted lines, is the slope of the recess 22 within base plate 6. Also visible in FIG. 6 is the downwardly projecting base plate keys 25 which consist of a front wall and two side walls at right angles thereto. The base plate keys 25 are adapted to fit within elongate aperture 15.

In operation, as a watercraft travels forwardly, the water moving in a direction shown as A in both FIGS. 1 and 4, moves upwardly through recess 22 and into the paddle wheel housing 7, thereby causing the paddle wheel 9 to rotate. As each one of the paddles 23,24 marked N or S approaches sensor wall 27 a different magnetic field is produced. With these changes in the magnetic field caused by an N paddle, S paddle and then another N paddle, different electrical signals are created. The frequency of these changes will vary according to the rate of rotation of the paddle wheel which is governed by the speed of the watercraft through the water. The changes in frequency are transmitted by the "hall-effect" device to a speedometer gauge which is calibrated to indicate the correct speed of the vessel.

The calibration of the speedometer of the present device is necessary because the speed of the water flowing through the channel can be different from the speed of the water within the boundary layer immediately adjacent the bottom surface of the hull, as well as different from the speed of the water outside the boundary layer. To carry out the calibration the number of pulses per minute, which is directly proportional to the number of revolutions of the paddle wheel, is noted. This is then correlated with the speed of the boat. To accomplish this, the speed of the boat is measured by a radar gun. By using this data the speedometer is calibrated to indicate a specific speed for a specific number of pulses per minute received by the speedometer sensor. That is to say, the manufacturer of the speedometer is required to create a speedometer showing a certain speed for a certain number of pulses. Studies have shown that the accuracy of the system for calibration is in the order of plus or minus 1 mile per hour between 40 and 50 miles per hour.

As can been seen from the drawings, and in particular drawings 3 and 4, there is no possibility of paddles 23,24 of paddle wheel 9 coming into contact with the lake bottom or other obstacles such as floating debris. Thus, the watercraft can even be beached. The speed measuring device of the present invention 3 is protected by the ride shoe 13.

Although a particular embodiment of the present invention has been described in detail it is understood that the spirit of the invention captures any configuration of speed measuring device which has a rotational paddle wheel mounted in a housing whereby the paddles are completely protected within a cavity within a housing.

What I claim as my invention is:

1. A speed measuring device for a watercraft, comprising:
    a protective housing having a pair of opposed side walls that at least in part define a narrow channel having an open underside and an open rear end;
    a paddle wheel rotatably mounted in said housing, said paddle wheel having a series of paddles that move through said channel upon rotation of said paddle wheel, said paddles being at a location that is completely recessed from the open underside of said channel;
    said channel being of a width greater than that of said paddle wheel;
    said protective housing being configured for attachment to a watercraft hull with said channel being oriented in the fore-and-aft direction of the hull with said open underside below the water line and open to the water, such that in operation said paddles are exposed to the water through which said watercraft travels to be rotated thereby, said paddles being recessed such that they do not at any time during rotation extend beyond the outer surface of said hull of said watercraft; and
    said device further comprising:
    sensing and readout means associated with said paddle wheel to indicate the water speed of said watercraft as a function of the speed of rotation of said paddle wheel.

2. A device as claimed in claim 1 wherein said channel is of constant width, decreasing in depth from said paddle wheel location towards one end;
    said end, in use, being oriented towards the front of the watercraft.

3. A device as claimed in claim 1 wherein said side walls of said protective housing have parallel free edges that extend upwardly, rearwardly and downwardly such that ends of said paddles do not extend beyond the outer edge of said sidewalls when said device is in use; and said sidewalls do not extend beyond the outer surface of the watercraft hull.

4. A watercraft speed measuring device as claimed in claim 3 wherein said housing includes a planar base plate which is mounted on a planar ride shoe in register with an elongate aperture located in said ride shoe;
    said ride shoe being substantially in the same plane as the hull bottom and attached thereto;
    wherein when in operation as the watercraft moves forwardly, water moves through said aperture into said open underside of said channel, causing said paddles to rotate thus creating an electro-magnetic signal.

5. A watercraft speed measuring device as claimed in claim 4 wherein said protective housing is integral with said base plate, and is located adjacent and rearward of a sealed housing containing said sensing means.

6. A device as claimed in claim 1 wherein said paddle wheel is mounted to rotate about an axis that is transverse to the length of said channel, and in a plane that is parallel to said opposed side walls.

7. In a watercraft including a hull, a speed sensing device which includes a paddle wheel rotatably mounted within a housing mounted in a recess of said hull comprises a series of paddles that are exposed below the water line of the hull to be engaged by the water through which the watercraft travels to effect rotation of the paddle wheel at a speed proportionately calibrated to the water speed of said watercraft, the improvement comprising a protective housing including opposed wall means defining a narrow longitudinally extending channel with an open underside, said channel increasing in depth from a forward end thereof to a rearward end thereof, and said paddle wheel being positioned relative to said channel at a location wherein said paddles pass through said channel upon rotation of said paddle wheel, and are at all times completely recessed from said open underside of said channel, such that said paddles do not extend beyond the bottom or sides of said hull, thus avoiding breakage or damage from obstacles or the floor of a body of water.

8. The improvement of claim 7 wherein said housing provides a rotatable mounting for said paddle wheel, said housing being releasably attachable to said hull and being positioned such that it does not protrude beyond the outer surface of the hull.

9. A speed measuring device for use with watercraft comprising:
   an elongate base plate including an elongate recess along the underside thereof;
   said recess increasing in height from a fore to a rear end;
   a rear housing integral with said base plate and extending upwardly therefrom;
   a paddle wheel including a plurality of paddles;
   said paddle wheel being rotatably mounted on a shaft within said rear housing;
   said rear housing having a pair of spaced apart walls;
   a cavity within said rear housing being open at the top, rear and bottom and being in open communication with said recess;
   said device further comprising a "hall-effect" device located within a sealed housing;
   said housing being adjacent said rear housing;
   said device further comprising a cable, said cable being directly connected at one end to said "hall-effect" device and at the other to an electrical power source and a speedometer;
   wherein, in operation, when said speed measuring device is mounted to a hull of a watercraft said paddles do not extend beyond the outer surface of the hull of said watercraft;
   and as said watercraft proceeds through the water, water flows into said recess, and into said rear housing, thereby causing said paddle wheel to rotate and produce a magnetic field of varying frequency which is sensed by said "hall-effect" device and translated into kilometers/miles per hour on said speedometer.

10. A speed measuring device as claimed in claim 9 wherein, in operation, said base plate is mounted on a ride shoe;
    said ride shoe being fixedly attached to a central section of the hull adjacent the rear thereof and lying substantially in the same plane as the hull bottom;
    said ride shoe further comprising an open-ended elongate aperture in its central rear portion;
    said base plate being adapted to be affixed on top of said ride shoe with said recess in register with said aperture, such that in operation, when the watercraft is in motion, water moves along the bottom of the hull, through said aperture, into said recess to said rear housing, causing said paddle wheel to rotate.

11. A speed measuring device as claimed in claim 10 wherein said base plate includes a plurality of threaded round apertures adapted to receive bolts which pass there through into a plurality of round apertures surrounding said elongate aperture on said ride shoe;
    said latter round apertures being in register with said former round apertures.

12. A speed measuring device as claimed in claim 10 wherein said recess commences adjacent the fore end of said base plate and terminates at said rear housing; said paddles extending downwardly below the top wall of said recess but not as far as the bottom of two parallel side walls forming said recess.

13. A speed measuring device as claimed in claim 12 wherein said side walls of said recess are adapted to extend downwardly below the plane of said base plate such that said sidewalls extend into said elongate aperture in said ride shoe while said base plate is adapted to rest upon the top of said ride shoe.

14. A speed measuring device as claimed in claim 9 wherein said rear housing comprises:
    a pair of vertically oriented circular side walls;
    said side walls being perpendicular to said base plate and being in spaced apart parallel relationship, said walls being spaced apart a distance substantially similar to the width of said recess and sufficiently large to permit said paddle wheel to rotate therebetween.

15. A speed measuring device as claimed in claim 9 wherein said paddle wheel has four paddles evenly spaced about a shaft at 90° intervals;
    two of said paddles being located 180° from one another, having a north pole charge, and said two other paddles having a south pole charge.

16. A speed measuring device as claimed in claim 9 wherein the rear wall of said sealed housing, which is adjacent said rear housing, is thinner than all other walls.

* * * * *